United States Patent
Shi et al.

(10) Patent No.: US 8,189,651 B2
(45) Date of Patent: May 29, 2012

(54) MEASURING HUM IN A DIGITAL TV SIGNAL

(76) Inventors: Pingnan Shi, Greenwood, IN (US); Daniel K. Chappell, Greenwood, IN (US); Walter Miller, Greenwood, IN (US); Gregory W. Massey, Greenfield, IN (US)

( * ) Notice: Subject to any disclaimer, the term of this patent is extended or adjusted under 35 U.S.C. 154(b) by 550 days.

(21) Appl. No.: 12/413,086

(22) Filed: Mar. 27, 2009

(65) Prior Publication Data

US 2009/0185037 A1   Jul. 23, 2009

Related U.S. Application Data

(63) Continuation-in-part of application No. 11/856,921, filed on Sep. 18, 2007, now Pat. No. 7,792,183.

(60) Provisional application No. 61/040,161, filed on Mar. 28, 2008, provisional application No. 60/829,181, filed on Oct. 12, 2006.

(51) Int. Cl.
*H04B 3/46* (2006.01)
*H04B 17/00* (2006.01)
*H04Q 1/20* (2006.01)

(52) U.S. Cl. .................. 375/224; 702/58; 324/76.11

(58) Field of Classification Search .................. 375/316, 375/320, 332, 224, 228, 261, 268; 725/69, 725/143; 702/58; 324/76.11
See application file for complete search history.

(56) References Cited

U.S. PATENT DOCUMENTS

| 4,905,086 | A | * | 2/1990 | Tahara | 348/723 |
|---|---|---|---|---|---|
| 5,260,792 | A | | 11/1993 | Toyoda et al. | 348/607 |
| 5,394,185 | A | | 2/1995 | Bernard | 348/192 |
| 5,673,293 | A | | 9/1997 | Scarpa et al. | 375/321 |
| 6,160,443 | A | * | 12/2000 | Maalej et al. | 329/304 |
| 6,249,180 | B1 | | 6/2001 | Maalej et al. | 329/304 |
| 6,754,260 | B1 | | 6/2004 | Itahara et al. | 375/224 |
| 7,086,083 | B2 | | 8/2006 | Zhang et al. | 725/143 |
| 7,142,609 | B2 | | 11/2006 | Terreault et al. | 375/261 |
| 7,162,731 | B2 | * | 1/2007 | Reidhead et al. | 725/107 |
| 7,529,303 | B1 | * | 5/2009 | Schwartzman et al. | 375/257 |
| 2003/0149991 | A1 | * | 8/2003 | Reidhead et al. | 725/119 |
| 2006/0023125 | A1 | * | 2/2006 | Zeidler | 348/731 |
| 2008/0048882 | A1 | | 2/2008 | Paugh et al. | 340/870.02 |
| 2008/0089402 | A1 | | 4/2008 | Massey et al. | 375/227 |
| 2009/0295995 | A1 | * | 12/2009 | Aggarwal et al. | 348/553 |

* cited by examiner

*Primary Examiner* — Jean B Corrielus

(74) *Attorney, Agent, or Firm* — Matthew A. Pequignot; Pequignot + Myers LLC

(57) ABSTRACT

The invention relates to a method for measuring Hum on a digital QAM carrier using a testing device for testing digital TV signals including a QAM demodulator therein, and to a testing device implementing the method. A micro-controller is used to sample a register associated with an AGC circuit in the QAM demodulator, and to process the collected register values to obtain one or more Hum characteristics.

20 Claims, 7 Drawing Sheets

MEASURING HUM IN A DIGITAL TV SIGNAL

CROSS-REFERENCE TO RELATED APPLICATIONS

The present invention claims priority from U.S. Provisional Patent Application No. 61/040,161 filed Mar. 28, 2008, entitled "Measuring Hum on Digital Carriers", by Shi et al, and is a continuation in part of U.S. patent application Ser. No. 11/856,921 filed Sep. 18, 2007, entitled "Digital Quality Index For QAM Digital Signals", by Massey et al., now issued U.S. Pat. No. 7,792,183, which claims priority from U.S. Provisional Patent Application No. 60/829,181 filed Oct. 12, 2006, all of which are incorporated herein by reference.

TECHNICAL FIELD

The present invention relates to measurements of Hum in a digital TV signal, and in particular relates to methods of measuring Hum in a quadrature amplitude modulated (QAM) digital channel in a CATV cable system using a QAM signal tester.

BACKGROUND OF THE INVENTION

Digitally modulated signals are used to transport high-speed data, video and voice on cable networks. The high-speed signals may be subject to a variety of impairments that can seriously impact the quality and reliability of the services being provided. One such potential impairment is known as Hum, and is caused by an ingress of the AC power line signal onto a coax cable plant. In the US, Hum appears as variations of the power of a TV signal at 60 Hz and/or its second harmonic 120 Hz, while in Europe corresponding frequencies are 50 Hz and 100 Hz.

The degree to which Hum is present in a TV signal is a key indicator of the "health" of a cable TV network, and is a required measurement per FCC regulation. Traditionally, the presence of Hum has been assessed by measuring a level fluctuation of sync tips of an analog TV signal, serving as reference points in time. However, in recent years the Community Antenna TeleVision (CATV) network has evolved from an unidirectional analog system to a bi-directional, Hybrid Fiber Coaxial with a mix of analog and digital signals, and it is expected that the digital portion of the CATV network will continue to increase. As the CATV industry is evolving towards total digital, in the future there may not be any analog TV signals left in the channel line-up to enable Hum measurement. Since there is no amplitude references in the digital TV signal, there is a need to find a different way to measure Hum that would be suitable for assessing the quality of digital TV signals.

Delivery of data services over cable television systems is typically compliant with a data-over-cable-service-interface-specifications (DOCSIS) standard. Digital TV (DTV) signals propagating in the coax cable plant of the CATV network typically include signals that are modulated using quadrature amplitude modulation (QAM), and can be referred to as QAM digital signals or QAM digital channel signals. In the United States, 64-QAM and 256-QAM are the mandated modulation schemes for digital cable as standardised by the SCTE in the standard ANSI/SCTE 07 2000.

There currently exists or have been disclosed a variety of test instruments for measuring different parameters representing the quality of a digital QAM TV signal in the CATV coax cable plant. To troubleshoot a subscriber's premises with a signal problem, a technician will travel to the premises or a hub nearby, and conduct a variety of tests on the digitally modulated signal, e.g. RF level, MER, pre- and post-FEC BER, and an evaluation of the constellation for impairments. In addition, the technician may look at the equalizer graph for evidence of micro-reflections, and check in-channel frequency response and group delay. Moreover, if the QAM analyzer is able, the measurements are repeated in the upstream direction. Hand-held battery-powered testing devices for testing DTV signals are a particularly convenient tool for performing TV signal measurements in the field. Unfortunately, such devices currently do not have the capability of measuring Hum on DTV signals.

U.S. Pat. No. 7,142,609, which is incorporated herein by reference, discloses a test instrument, which teaches a method and an apparatus for detecting and quantifying impairments in digital QAM signals. This patent teaches measuring Hum by de-modulating the digital QAM signal, and by using a spectrum analyzer functionality to sample the I and Q quadrature components of the de-modulated QAM signal and to trigger the sampling sequences to the power line to extract Hum-related modulation of the TV signal.

One drawback of this approach is that it requires the use of a power line for triggering, which is not available in a battery operated device.

Another drawback of this approach is that Hum components that are not synchronized with the 60 Hz line rate, for example disturbances in a TV signal that are related to faults in switching-type power supply circuits that are often used in trunk amplifiers and line extenders in a CATV network, may not be properly evaluated. Furthermore, using a power line for triggering in measuring Hum may fail if Hum is related to a battery back-up power supply which is not synchronized with the main power supply.

Accordingly, there is a need to have a simple and efficient method for measuring Hum on a digital QAM carrier with a battery-operated tester device for testing QAM digital signals.

SUMMARY OF THE INVENTION

An object of the present invention is to provide a simple and efficient method for measuring Hum on a QAM digital carrier in cable network with a battery-powered testing device, and to provide a battery-powered testing device implementing such method.

In accordance with the invention, there is provided a method for measuring Hum in a digital TV signal using a testing device for testing QAM signals on a cable TV network, the method comprising: a) receiving the QAM digital TV signal with the battery powered testing device comprising a tuner, a QAM demodulator coupled to receive a digital channel signal from the tuner, and a controller having memory, the QAM demodulator including an automatic gain control (AGC) circuit, the AGC circuit including an AGC register for storing a current AGC value, b) sampling values stored in the AGC register at a pre-defined sampling rate R that exceeds a characteristic Hum frequency to obtain a plurality of AGC register values; c) providing the plurality of AGC register values to the controller for analysis to obtain one or more Hum characteristics; and, d) reporting to a user or storing in memory the one or more of Hum characteristics.

Another aspect of the present invention provides a battery powered testing device for testing a digital TV signal on a cable network, comprising: an input port for receiving the digital TV signal; a tuner coupled to the input port for selecting a digital QAM channel signal from the digital TV signal;

a QAM demodulator coupled to the tuner to receive the digital QAM channel signal from the tuner and including an automatic gain control circuit (AGC) for generating AGC values, the AGC circuit including an AGC register for storing said AGC values, and an AGC register communication port for accessing the content of the AGC register; a controller coupled to the tuner for controlling operation thereof and to the AGC register port of the QAM demodulator for sampling the content of the AGC register; and, an output device coupled to the controller. The controller is programmed to perform operations comprising: a) sampling values stored in the AGC register at a pre-defined sampling rate R that exceeds a characteristic Hum frequency to obtain a plurality of AGC register values; b) analyzing the plurality of AGC register values to obtain one or more Hum characteristics; and, c) providing the one or more of Hum characteristics to the output device for storing therein or reporting to a user.

BRIEF DESCRIPTION OF THE DRAWINGS

The invention will be described in greater detail with reference to the accompanying drawings which represent preferred embodiments thereof, in which like elements are indicated with like reference labels, and wherein.

DETAILED DESCRIPTION

Figure 1:
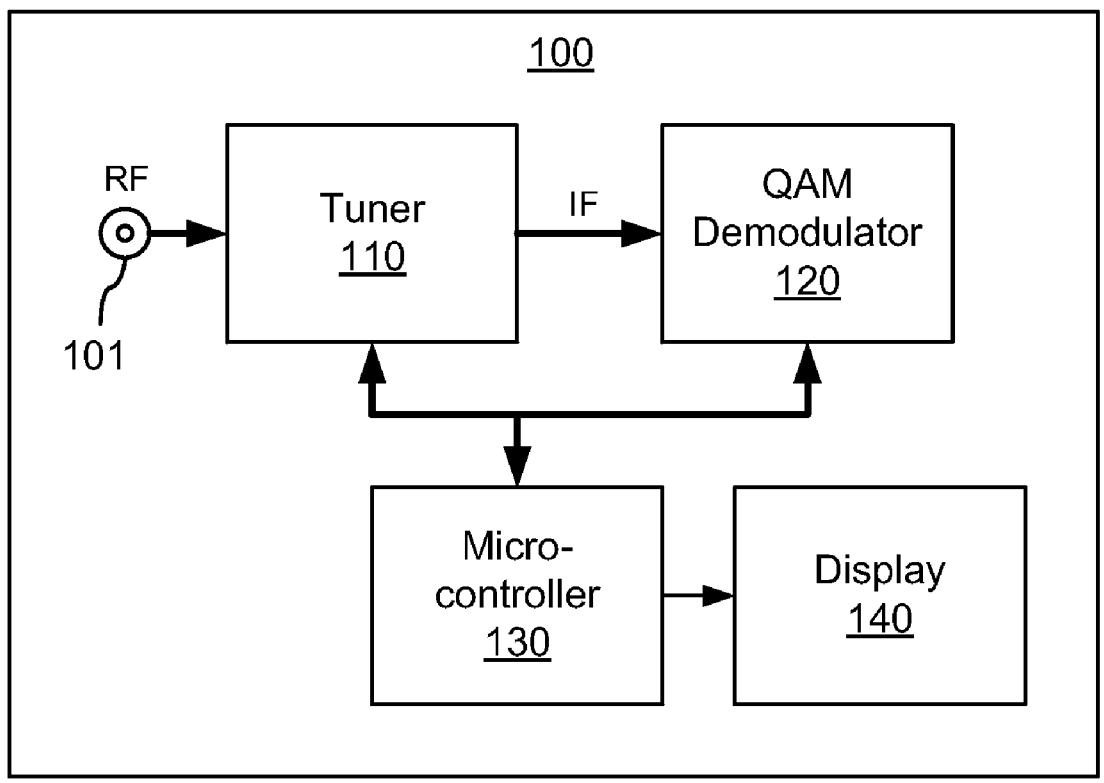
FIG. 1 is a schematic block diagram of a prior art tester device for testing a digital TV signal.

With reference to FIG. 1, a tester device (TD) 100 for testing the quality of a digital TV (DTV) signal in a cable network typically includes an input port 101 for receiving the QAM DTV signal from a cable in the cable network, a tuner 110 coupled to the input port 101 for selecting a digital QAM channel signal from the QAM DTV signal, a QAM demodulator 120 coupled to the tuner 110 to receive the digital QAM channel signal from the tuner 110. A micro-controller 130 is provided that is coupled to the tuner 110 and the QAM demodulator 120 for controlling operation thereof. A display unit 140 coupled to the controller 130 for displaying test result after and/or during the measurement. The TD 100 may also include a keypad (not shown), and possibly an Ethernet or other external connection for connection to a personal computer or a network. The QAM demodulator 120 may perform several functions on the received signal, such as carrier frequency acquisition, carrier phase tracking, symbol rate tracking, adaptive equalization, and J.83 channel decoding, and output performance parameters related thereto. By probing into the elements of the QAM demodulator 120 upon request from a user or following a pre-programmed test schedule, the micro-controller 130 can retrieve information on the modulation error ration (MER), pre- and post-FEC (forward error correction) BER (bit error rate), and channel response, which is part of physical layer testing. One example of the TD 100 is a DSAM-6000 Network Maintenance Sweep Meter, available from JDSU Inc. Another example of the TD 100 is a DQI testing device for measuring a digital quality index (DQITM) that is disclosed in U.S. Pat. No. 7,792,183 filed Sep. 18, 2007, which is incorporated herein by reference.

Figure 2:
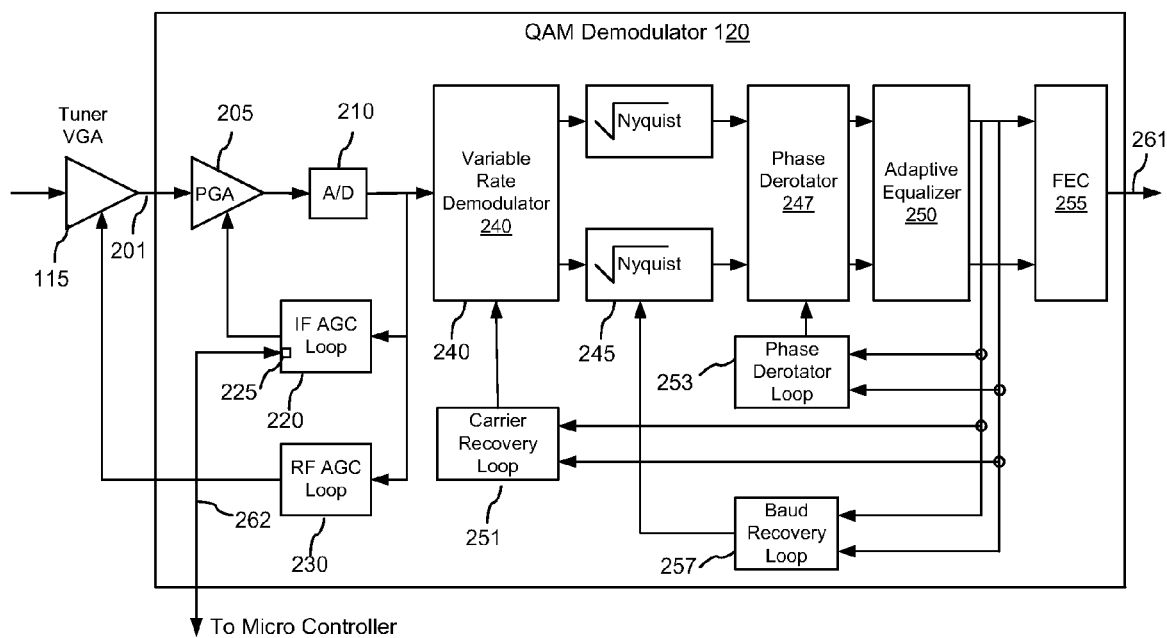
FIG. 2 is a schematic block diagram of a QAM demodulator with sampling of an AGC register according to the present invention.

With reference to FIG. 2, the QAM demodulator 120 has at its input a programmable gain amplifier (PGA) 205, that receives the QAM channel signal 201 from the tuner 110, which includes a variable gain amplifier (VGA) 115. The PGA 205 connects to an analog to digital converter (ADC) 210 that samples the received QAM channel signal. The ADC 210 connects to an in-band variable rate demodulator 240, which typically includes a quadrature mixer and multi-rate filters, and which outputs I and Q baseband signals. The I and Q baseband signals are then filtered by dual square-root Nyquist filters 245, followed by a phase recovery block 247 and an adaptive equalizer circuit 250, which connects to a FEC block 255 that generates error correction and other relevant output information, including pre-FEC and post-FEC BER. Carrier recovery loop 251, Baud recover loop 257, and phase recovery loop 253 connecting at the output of the adaptive equalizer 250 are further provided as known in the art. One example of the QAM demodulator 120 is the BCM3125 QAMLink® Universal Set-Top Box Transceiver available from Broadcom Corp.

In some embodiments, the QAM demodulator (QAM demodulator) 120 may incorporate two automatic gain control circuits (AGC) at its input, an IF (Intermediate Frequency) AGC circuit 220 for controlling the gain of the PGA 205, and an RF (Radio Frequency) AGC circuit 230 for controlling the gain of the VGA 115 at the output of the tuner 110. The AGC circuits 220, 230 generate AGC values and provide them to AGC ports of their respective amplifiers for controlling their gain. When the signal level S of the QAM channel signal at the output of the ADC 210 increases, the AGC values decrease, thus decreasing the gain of the VGA 115 and PGA 205. When the signal level S decreases, the AGC value increases, thus increasing the gain of the VGA 115 and PGA 205. The two AGC circuits work together to stabilize the signal level S at the input of the ADC 210. Typically, the RF AGC circuit 230 follows large signal level changes and thus provides a coarse stabilization of the ADC output signal so that variations in the QAM channel signal 201 received by the QAM demodulator 120 may be reduced to a lower level. The IF AGC circuit 220 is typically more sensitive to variation in the output signal of the ADC 210 and has the ability to compensate for relatively small changes in the signal level of the input QAM signal 201, for example down to 0.1% or less, thus providing a finer stabilization of the ADC output signal. Exemplary embodiments of the present invention utilize the IF AGC circuit 220 to measure Hum in the QAM channel signal 201 received by the QAM demodulator 120.

Figure 3:
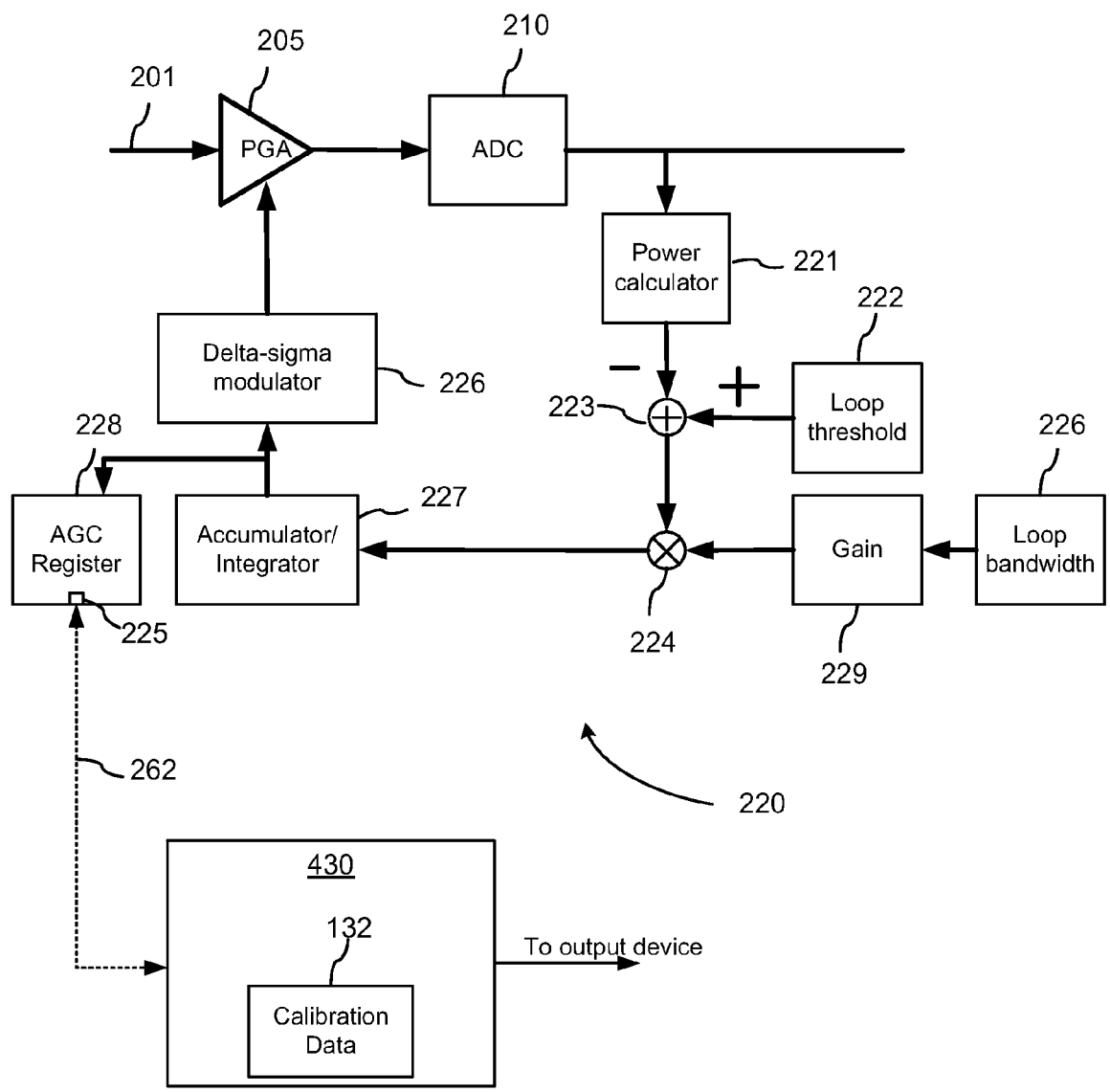
FIG. 3 is a schematic block diagram illustrating an AGC circuit of the QAM demodulator of FIG. 2 coupled to a micro-controller for sampling the AGC register.

With reference to FIG. 3, the IF AGC circuit 220 of the QAM demodulator 102 in one embodiment of the invention includes a power calculator block 221, which connects to an inverting input port of an adder 223, functioning as a subtractor. An output port of the adder 223 connects to a multiplier 224, which is followed by an accumulator 227, which connects to a delta-sigma modulator (DSM) 226, an output of which is provided to an AGC port of the PGA 205 for controlling the PGA gain. The IF AGC circuit 220 shown in FIG. 3 generally operates as known in the art. The power calculator block 221 receives a stream of samples of the QAM channel signal from the ADC 210, and calculates therefrom a signal power value P that is generally proportional to the power of the QAM signal at the output of the PGA 205. At the adder 223, the signal power value P is compared to a threshold value $P_0$. A resulting difference signal $s \cong (P_0 - P)$, is scaled with a suitable scaling factor at the multiplier 224, with the scaling factor provided by a gain block 229 in dependence upon a loop bandwidth parameter as represented by a block 226, as known in the art. The scaled difference signal s is provided to the accumulator 227 for integration as known in the art. The accumulator 227 generates a stream of AGC values that are then provided to the DSM 226 for converting into an analog form suitable for controlling the gain of the PGA 205 according to a current AGC value. In operation, the AGC value at the output of the accumulator 226 is updated at a pre-determined rate, that by way of example can be in the order of MHz.

In the present invention, a memory register 228 provided in the QAM Demodulator 120 is associated with the AGC circuit 220, and monitors the output of the accumulator 227 and stores a current AGC value received from the accumulator 227; this register will be referred to herein as the AGC register 228, while values stored therein at different times will be referred to as AGC register values. The AGC value stored in this register varies generally in inverse relationship with the QAM channel power signal level, meaning that if the QAM signal level is moving lower, the AGC value stored in the AGC register 228 increases so that the gain of the PGA 205 is increased to maintain the QAM signal at the output of the PGA 205 at a desired level. By way of example, if the QAM signal level at the input port of the PGA 205 decreases by 10%, the AGC value stored in the AGC register 228 increases by about 10% to compensate for the change in the input signal level, with possible deviations from the exact proportionality due to non-linearities in the AGC circuit 220.

Accordingly, one aspect of the present invention provides a method for measuring Hum in a digital TV (DTV) signal by a) receiving the DTV signal with the testing device such as the TD 100, b) sampling values stored in the AGC register 220 at a pre-defined sampling rate R that exceeds the characteristic Hum frequency $f_H$ to obtain a plurality of AGC values; and, c) providing the plurality of AGC values for analysis to a suitably programmed micro-controller 430, as indicated by a dashed arrow 262 in FIG. 3; the controller is programmed to obtain one or more Hum characteristics, which can then be communicated to a user or stored for future use. The Hum characteristics that the method provides may include a Hum spectrum, the depth of Hum modulation, for example in terms of a peak to valley ratio, and Hum frequency components that characterize the Hum signal at the characteristic Hum frequency $f_H$, which is 60 Hz in US and Canada, and optionally one or more harmonics thereof at $2f_H$, $3f_H$ etc., depending on requirements of a particular application. The characteristic Hum frequency $f_H$, e.g. 60 Hz in US and Canada, may also be referred to herein as the Hum modulation frequency or simply as the Hum frequency.

Figure 4:
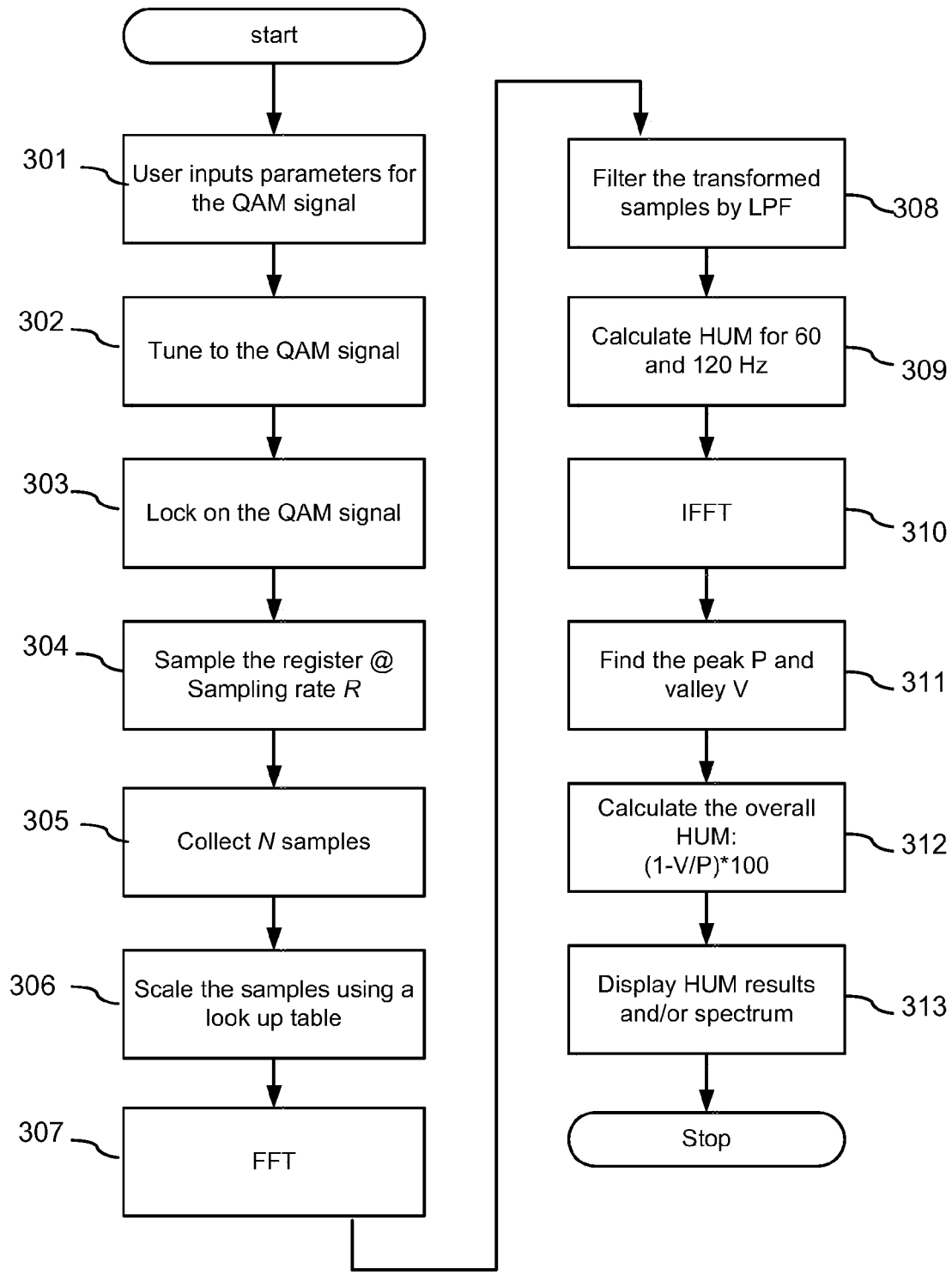
FIG. 4 is a flowchart of one embodiment of the method for measuring Hum according to the present invention.

With reference to FIG. 4, one embodiment of the method for measuring Hum in DTV signals may include the following steps:

In step 301, the user inputs parameters for the QAM signal to be measured, which include a QAM carrier frequency of a particular DTV channel, and may also include specific parameters defining QAM type, symbol rate, and a particular standard according to which the measurements are to be performed. By way of example, these parameters may be 801 MHz, 256 QAM, 5.361MSPS, and Annex B (of ITU-T J.83).

In a step 302, the tuner 110 is tuned by the micro-controller 430 to the QAM carrier frequency corresponding to the selected DTV channel, which is 801 MHz in the example given hereinabove.

In a step 303, the micro-controller 430 executes a script using the provided input parameters, so as to direct the QAM demodulator 120 to lock on to the QAM channel signal of the selected DTV channel, and demodulate it.

It will be appreciated that the steps 301-303 may be omitted, for example if the used testing device is pre-set for performing measurements on a specified DTV channel.

In a step 304, the micro-controller 430 samples the AGC register 228 by repeatedly reading its content using a communication link 262 at a pre-defined sampling rate R, which exceeds the Hum modulation frequency $f_H$. Preferably, the sampling rate R should be at least 4 times greater than $f_H$, and generally at least four times greater than a highest frequency component of Hum which is to be measured. A suitable exemplary frequency range wherein the sampling rate R may be selected is anywhere from about 800 sps (samples per second) to about 10 ksps (kilo samples per second) or higher. By way of example, R is assumed to be 7.68 ksps in the description following hereinbelow.

In a step 305, the micro-controller 430 collects a plurality of N AGC register samples and stores them in memory; here N is a predefined number of collected samples that depends on the sampling rate R and is selected to cover one or more cycles of an oscillation waveform at the Hum modulation frequency $f_H$. By way of example, N corresponds to two cycles of a 60 Hz waveform, so that for R=7.68 ksps, N=256 samples is collected. It will be appreciated that longer sequences of samples may result in more accurate measurements, but increase the measurement and data processing time.

In a step 306, the plurality of AGC register values collected by the micro-controller 430 may be scaled or transformed using pre-determined AGC calibration data relating AGC register values to a signal level of the QAM digital channel signal received by the QAM modulator 120, so that variations within the plurality of AGC register values after the transformation represent variations in the signal level of the received QAM DTV signal 201. The calibration data may be obtained at the time of the device calibration by varying the power of a QAM DTV signal received by the testing device, and recording corresponding AGC register values.

In one embodiment, the collected AGC register values are converted or transformed to a voltage scale by using a look up table, or a representation of a mathematical function pre-defined in software of firmware at the time of device calibration. After this conversion, variations in the AGC register values being processed by the micro-controller 430 become proportional to variations in the voltage level of the QAM DTV signal 201 received by the TD.

Figure 5A:
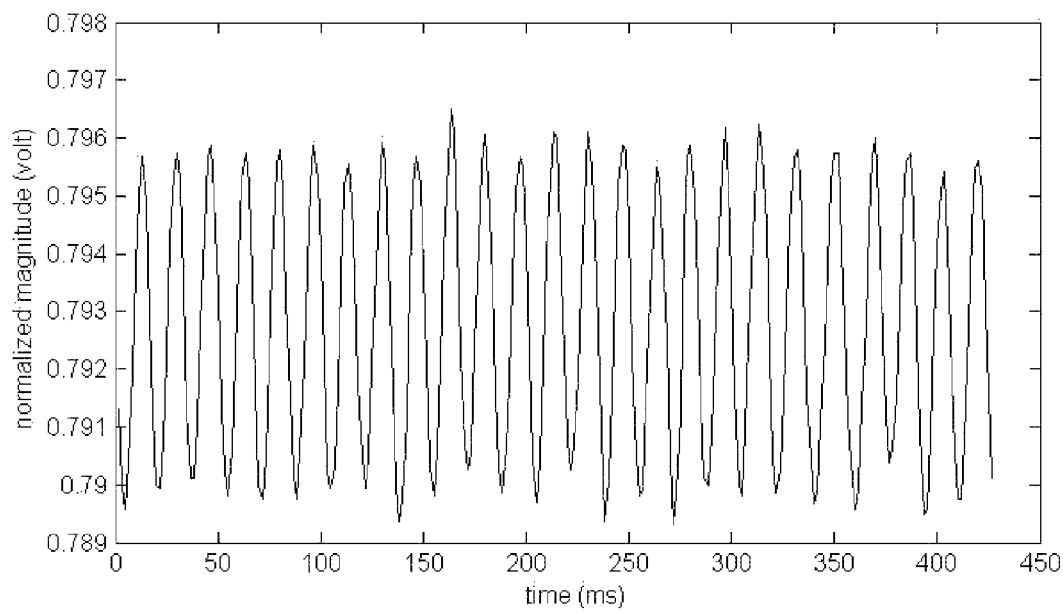
FIG. 5A is a graph illustrating Hum in a time sequence of AGC samples obtained according to the present invention.

FIG. 5A shows by way of example the plurality of AGC register values versus time after the conversion using the look up table, which in this case includes a normalization to between 0 and 1 Volt. The presence of a 60 Hz Hum component in the collected plurality of the AGC registry values is clearly visible in the figure.

In a step 307, the N AGC register values are converted to frequency domain by performing an FFT (Fast Fourier Transform) operation. This operation provides a frequency spectrum of the AGC register values in the form of a set of transformed samples Y(k), where k=0, 1, 2, ..., N−1.

In a step 308, the frequency spectrum of the AGC register values is filtered by a Low Pass Filter (LPF), which by way of example may have a bandwidth of about 1 kHz, to obtain a filtered spectrum wherein high-frequency components are suppressed. This filtering is done by multiplication of the transformed samples Y(k) and a frequency response function of the LPF.

In one embodiment, this frequency spectrum can be saved in a non-volatile memory for future use. In other embodiment, it can be presented to a user with a display, or sent to a remote system via a communication port, as described hereinbelow with reference to FIG. 7.

Figure 5B:
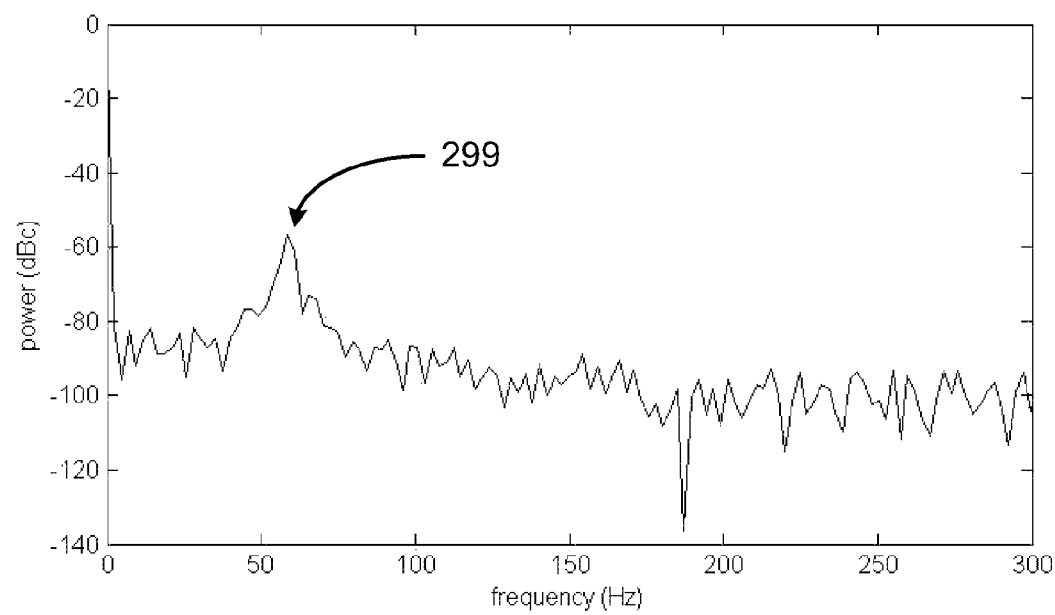
FIG. 5B is a graph illustrating Hum frequency spectrum obtain according to the present invention.

FIG. 5B shows the frequency spectrum corresponding to the time-domain sequence of the AGC registry values shown in FIG. 5A. The spectrum clearly shows a peak 229 at 60 Hz, which indicates the presence of a 60 Hz Hum in the measured QAM DTV signal.

In a step 309, one or more Hum frequency components are obtained based on magnitudes of the frequency spectrum of the AGC register values or, preferably, of the filtered spectrum, at the characteristic Hum frequency and/or one or more harmonics thereof. By way of example, with N=256, Hum frequency components for 60 Hz and 120 Hz may be computed as follows:

$$\text{Hum}(60\text{ Hz}) = ((2 \cdot |Y(2)|)/(|Y(0)| + 2 \cdot |Y(2)|)) \cdot 200 \quad (1)$$

$$\text{Hum}(120\text{ Hz}) = ((2 \cdot |Y(4)|)/(|Y(0)| + 2 \cdot |Y(4)|)) \cdot 200 \quad (2)$$

where |x| means an absolute value of 'x', and the unit for Hum(60 Hz) and Hum(120 Hz) is percentage.

Figure 6:
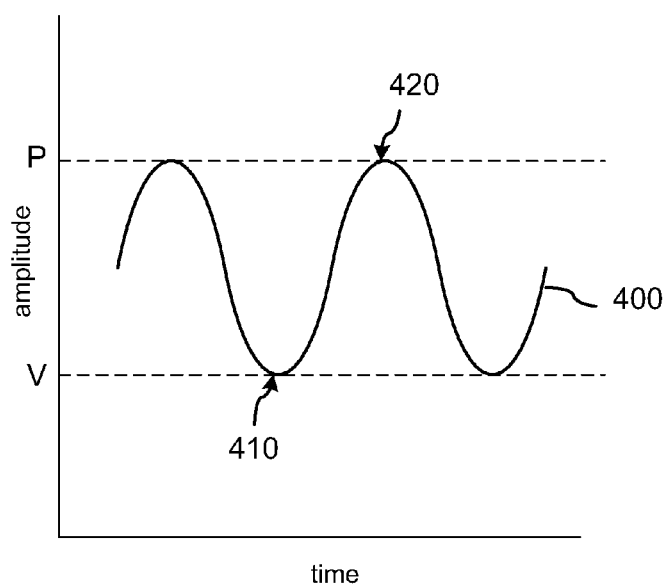
FIG. 6 is a schematic view illustrating Hum related peaks and valleys in the time sequence of AGC samples.

In a step 310, the filtered spectrum is transformed back to time domain by performing an Inverse Fast Fourier Transform (IFFT) to obtain a filtered time-domain sequence of AGC samples, a portion of which sequence is schematically illustrated in FIG. 6 with a curve 400.

In a step 311, the filtered time-domain sequence of AGC samples 400 is processed to identify peaks 420 and valleys 410 therein, and to determine corresponding peak value P and valley value V from the magnitudes of the filtered time-domain sequence 400 at the peaks 410 and valleys 420 thereof.

In a step 312, a Hum peak-to-valley ratio (HPVR) parameter is computed for the filtered time-domain sequence of AGC samples 400, based for example on the following equation (3):

$$\text{HPVR} = (1 - V/P) \cdot 100, \quad (3)$$

where the unit is percentage.

In a step 313, one or more of the Hum characteristics that have been determined in previous steps are reported to a user, for example by displaying them with a display or sending them to a separate computer or via a network to a remote system, or stored in a non-volatile memory device. By way of example, a spectrum plot such as that shown in FIG. 5B can be generated using the results obtained in step 308 and displayed to the user. Similarly, the HPVR computed in step 312, and/or the Hum frequency components at 60 Hz and, optionally 120 Hz, 180 Hz etc. can be displayed, stored or communicated to a remote user.

It will be appreciated that the sequence of steps described hereinabove and illustrated in FIG. 4 is exemplary, and may be modified as required by a particular application, for example to provide additional or different Hum characteristics; accordingly, some of the data processing steps described hereinabove for processing the plurality of AGC values collected by the micro-controller may be omitted, and other steps added, for example as required for a particular application. For example, suitable scaling of the data can be performed at various stages of the data processing, or raw un-scaled data may be saved for future processing, and/or used to compute and display some of the Hum related parameters, such as but not limited to HPVR.

Advantageously, the method described hereinabove does not require that the testing device used is connected to a power line for performing the Hum measurements. The method can be used in a battery-operated or powered testing device that does not rely on a power line for operation, and can be disconnected and remote from a power line during the Hum measurements. In some embodiments, the device may have the capability of being powered by either a battery or a power line during operation.

Another aspect of the present invention provides a testing device with Hum measuring capability for testing a digital TV signal on a cable network, which is configured to implement the method of the present invention described hereinabove, or a variation thereof.

Figure 7:
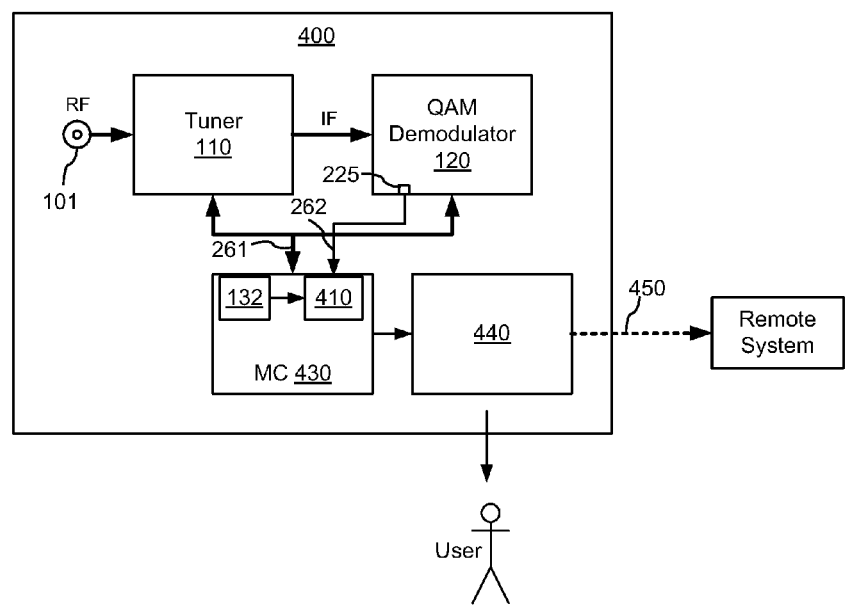
FIG. 7 is a schematic block diagram of a testing device according to the present invention.

With reference to FIG. 7, there is illustrated a TD 400 having Hum measuring capability according to an embodiment of the present invention. Note that in FIG. 7 elements that have same functionality as respective elements in FIG. 1 are indicated with same reference numerals. Similarly to TD 100, TD 400 includes the input port 101 for receiving a QAM DTV signal 201, for example a coaxial cable connector, which is coupled to the tuner 110 for selecting a QAM channel signal from the QAM DTV signal. The QAM demodulator 120, which receives the QAM channel signal from the tuner 110, includes the IF AGC circuit 220 as shown in FIG. 3 for generating the AGC values, which are stored in the AGC register 228. The QAM demodulator 120 includes the AGC register communication port 225 for accessing the content of the AGC register 228, which is connected to a micro-controller 430. The micro-controller 430 is coupled to the tuner 110 for controlling operation thereof as described hereinabove. A communication link 262 is further provided connecting the micro-controller 430 with the AGC register port 225 of the QAM demodulator 120 for sampling the content of the AGC register 228 at the sampling rate R. The micro-controller 430 may also receive from QAM demodulator 120, via a communication link generally indicated at 261, other data that relates to the QAM signal quality, such as MER, pre- and post-FEC BER, etc., for example as described in U.S. Patent Publication No 2008/0089402. The micro-controller 430 provides test results, including one or more of the Hum characteristics, to an output device 440 for storing therein for future use, reporting to the user, or communicating to a remote system via a network as indicated by an arrow 450.

The micro-controller 430 is programmed to perform the following operations: a) sampling values stored in the AGC register 228 at the pre-defined sampling rate R that exceeds the characteristic Hum frequency $f_H$ to obtain a plurality of AGC register values, b) analyzing the plurality of AGC register values to obtain one or more Hum characteristics such as those described hereinabove with reference to FIG. 4, and c) providing the one or more of Hum characteristics to the output device 440. In one embodiment, the micro-controller 430 includes a Hum processing module (HPM) 410, which implements Hum processing logic as represented by blocks 304 through 312 in FIG. 4 and described hereinabove with reference thereto. The HPM 410 may be embodied with special purpose software or firmware including instructions for performing operations such as those described at blocks 304-312, or as suitably configured logic circuits. The HPM 410 may further include modules for performing FFT and IFFT operations and other data processing steps as described hereinabove with reference to FIG. 4. The micro-controller 430 may further include pre-determined calibration data 132 relating AGC register values to the signal level of the QAM DTV signal received with the input port 101 as described hereinabove, which may be stored in internal memory of the micro-controller 430, or in a separate non-volatile memory provided with the TD 400.

In one embodiment, the output device 440 is a display unit capable of displaying the Hum characteristics obtained by the micro-controller 430 as described hereinabove, including one or more of the following: HPVR, Hum component at the Hum modulation frequency, e.g. 60 Hz, and/or one or more harmonics thereof, and Hum spectrum.

In one embodiment, the output device 440 is a non-volatile memory, such as a hard drive, a solid-state memory, flash memory, and alike, for storing the Hum characteristics for future use.

In one embodiment, the output device 440 is a communication port, such as an Ethernet port, a USB port, or an RF transmitter connected to the CATV network, for communicating the Hum characteristics to a remote system.

In some embodiments, the TD 400 may include a combination of two or three output devices such as the display, communication port, and non-volatile memory.

In one preferred embodiment, the TD 400 is a battery powered device, such as a hand-held battery powered device for performing integrated measurements of quality parameters for QAM DTV signals in a cable network.

Implementation Example

The QAM demodulator 120 may be implemented using Single-Chip Cable Modem BCM3349 available from Broadcom Corp, Irvine, Calif., which is used in the network maintenance sweep meter DSAM-6000 (Digital Service Analysis Meter) produced by JDSU Inc. BCM3349 has four 8-bits data registers labeled DS_MB0, DS_MB1, DS_MB2, and DS_MB3, and an 8-bits operation register labeled DS_MBOP. By writing a specific binary code to DS_MBOP, the micro-controller 410 can read from or write to various key functional blocks in the QAM demodulator chip via a communication link therebetween. In particular, the HPM 410 may include instructions to write "0x8A" to DS_MBOP to cause the output of the accumulator 227 to be copied to DS_MB0-3, which will then perform the function of the AGC register 228. The HPM 410 further includes instructions for reading values stored in these registers at the sampling rate R. DS_MB0 contains the most significant byte. DS_MB1 has the next most significant byte. DS_MB2 has the next most significant byte. And DS_MB3 has the least significant byte.

It should be understood that each of the preceding embodiments of the present invention may utilize a portion of another embodiment.

Of course numerous other embodiments may be envisioned without departing from the spirit and scope of the invention.

We claim:

1. A method for measuring Hum in a digital television (TV) signal comprising quadrature amplitude modulation (QAM) signals using a testing device for testing QAM signals on a cable TV network, the method comprising:
    a) receiving the digital TV signal with the testing device, which comprises a tuner, a QAM demodulator coupled to receive a digital channel signal from the tuner, and a controller having memory, the QAM demodulator including an automatic gain control (AGC) circuit, the AGC circuit including an AGC register for storing a current AGC value,
    b) sampling values stored in the AGC register at a predefined sampling rate R that exceeds a characteristic Hum frequency to obtain a plurality of AGC register values;
    c) providing the plurality of AGC register values to the controller for analysis to obtain one or more Hum characteristics; and,
    d) reporting to a user or storing in memory the one or more Hum characteristics.

2. The method of claim 1, wherein the one or more Hum characteristics comprises a Hum peak to valley ratio (HPVR) parameter, and wherein step c) comprises determining the HPVR parameter based on the plurality of AGC register values.

3. The method of claim 1, further comprising providing AGC calibration data relating AGC register values to a signal level of the digital TV QAM signal.

4. The method of claim 3, comprising converting the AGC register values to a voltage scale using a look-up table or a representation of a mathematical function relating AGC register values to signal level values of the digital TV signal received by the testing device.

5. The method of claim 3, further comprising obtaining the AGC calibration data by varying the power of the digital TV signal received by the testing device, and recording corresponding AGC register values.

6. The method of claim 3, wherein step c) comprises transforming the plurality of AGC register values using the calibration data.

7. The method of claim 1, wherein step c) comprises obtaining a frequency spectrum of the AGC register values by performing a fast Fourier transform (FFT) operation on the plurality of AGC register values.

8. The method of claim 7, wherein step d) comprises displaying the frequency spectrum of the AGC register values with a display.

9. The method of claim 7, wherein step d) comprises recording the frequency spectrum of the AGC register values to a non-volatile memory.

10. The method of claim 7 wherein step c) further comprises applying a low pass filter to the frequency spectrum of the AGC register values to obtain a filtered spectrum.

11. The method of claim 10 wherein the one or more Hum characteristics include a Hum frequency component at the characteristic Hum frequency and/or one or more harmonics thereof, and wherein step c) further comprises determining the Hum frequency component from magnitudes of the frequency spectrum of the AGC register values or the filtered spectrum at the characteristic Hum frequency and/or one or more harmonics thereof.

12. The method of claim 11 further comprising scaling the Hum frequency component using pre-determined calibration data.

13. The method of claim 10, wherein step c) further comprises:
    performing an inverse FFT (IFFT) on the filtered spectrum to obtain a filtered time-domain sequence of AGC samples, and
    computing a Hum peak-to-valley ratio (HPVR) parameter for the filtered time-domain sequence of AGC samples.

14. The method of claim 13, wherein computing the HPVR parameter includes using calibration data relating AGC register values to signal level values of the digital TV signal received by the testing device.

15. The method of claim 1, wherein the QAM demodulator includes an intermediate frequency (IF) programmable gain amplifier (PGA), and wherein the AGC circuit is for controlling a gain of the IF PGA.

16. A battery powered testing device for testing a digital television (TV) signal on a cable TV network, comprising:
- an input port for receiving the digital TV signal;
- a tuner coupled to the input port for selecting a digital quadrature amplitude modulation (QAM) channel signal from the digital TV signal;
- a QAM demodulator coupled to the tuner to receive the digital QAM channel signal from the tuner and including
  - an automatic gain control circuit (AGC) for generating AGC values,
  - the AGC circuit including an AGC register for storing said AGC values, and
  - an AGC register communication port for accessing the content of the AGC register;
- a controller coupled to the tuner for controlling operation thereof and to the AGC register port of the QAM demodulator for sampling the content of the AGC register; and,
- an output device coupled to the controller;
- wherein the controller is programmed to perform operations comprising:
  - a) sampling values stored in the AGC register at a predefined sampling rate R that exceeds a characteristic Hum frequency to obtain a plurality of AGC register values;
  - b) analyzing the plurality of AGC register values to obtain one or more Hum characteristics; and,
  - c) providing the one or more of Hum characteristics to the output device for storing therein or reporting to a user.

17. The testing device of claim 16, wherein the controller comprises memory for storing calibration data relating AGC register values to a signal level of the digital TV signal received by the testing device.

18. The testing device of claim 16, wherein the output device comprises a display unit for displaying the one or more Hum characteristics to the user.

19. The testing device of claim 16, wherein the output device comprise a non-volatile memory for storing the one or more Hum characteristics for future use.

20. The testing device of claim 16, wherein the output device comprises a communication port for communicating the one or more Hum characteristics to a remote system.

* * * * *